June 9, 1931.  E. BURT  1,808,917
FILTER
Filed Dec. 10, 1928

INVENTOR.
Edwin Burt
BY Geo. E. Ibaldo
ATTORNEY.

Patented June 9, 1931

1,808,917

UNITED STATES PATENT OFFICE

EDWIN BURT, OF CANUTILLO, TEXAS

FILTER

Application filed December 10, 1928. Serial No. 325,036.

The invention relates to improvements in filters such as are disclosed in my prior Patent No. 931,267, dated August 17, 1909, the primary object of the present invention being the provision of improved means for supplying material to such filter chambers.

Another object of the invention is the provision of improved means for prolonging the operative life of such means.

Another object of the invention is the provision of means for protecting the chamber mounting from corrosive action of the contents of the filter chamber.

Other objects will appear hereinafter.

The invention consists in the combinations and arrangement of parts hereinafter described and claimed.

The invention will be best understood by reference to the accompanying drawings forming a part of this specification and in which—

Figure 1:
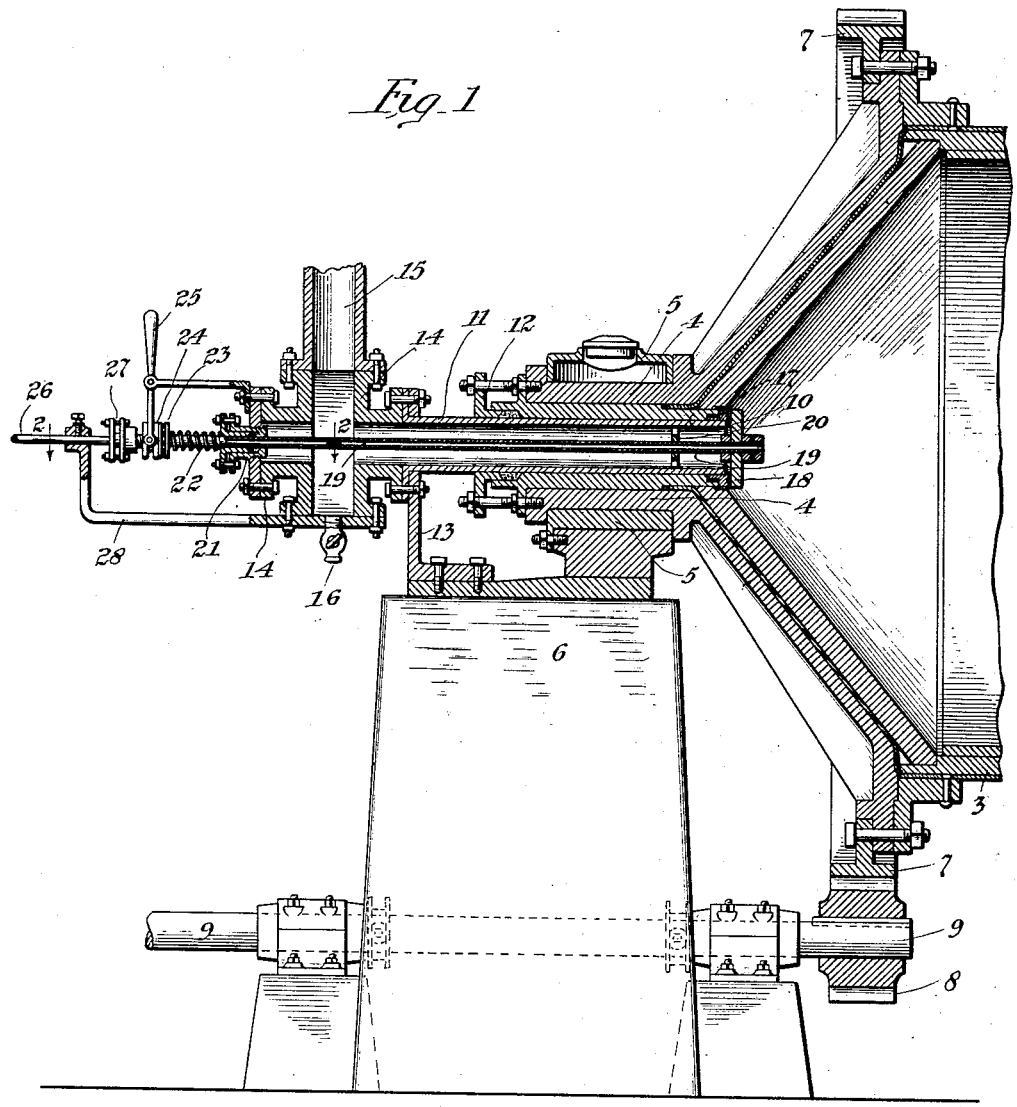
Figure 2:
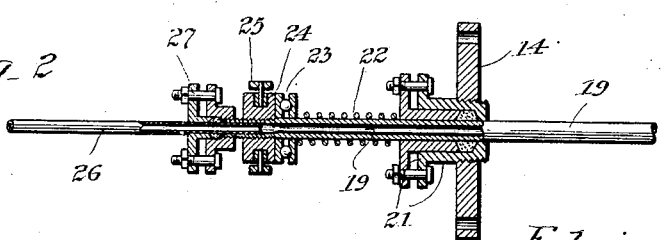

Fig. 1 is a vertical section taken through the entry or supply end of a filter chamber equipped with means embodying the invention; and Fig. 2, an enlarged detail horizontal section taken substantially on the line 2—2 of Fig. 1.

The preferred form of construction, as illustrated in the drawings, comprises a suitable revolving filter chamber 3 mounted to revolve upon a central trunnion 4 operating in a suitable bearing 5 on a foundation 6.

The filter chamber 3 also carries a peripheral driving gear 7 meshing with a pinion 8 on a driving shaft 9 extending through the foundation 6 as shown.

The trunnion 4 is made hollow or tubular in form and is provided with an interior lining 10, preferably of noncorrosive metal. Arranged within the lining 10 is a stationary supply nipple 11 extending through a suitable stuffing box or gland 12 for sealing the connection. At its outer end, the nipple 11 is bolted to a bracket 13 on the foundation 6. The outer end of the nipple 11 is also connected with a cross fitting 14 into which a supply pipe 15 leads and whereby material for filtering can be supplied to the chamber 3, as will be readily understood. The fitting 14 is provided at its bottom with a drain valve 16 for obvious purposes.

At its inner end, the trunnion lining 10 is provided with a valve seat 17 cooperating with a valve 18 rigidly secured, as shown, to the inner end of a tubular valve stem 19 extending outwardly through the nipple 11. The valve stem 19 is slidably mounted at one end in a supporting spider 20 in the nipple 11 and at its other end in a suitable stuffing box or gland 21. A compression spring 22 is arranged on the valve stem 19 between the stuffing box 22 and a thrust bearing 23. A grooved collar 24 is secured to the outer end of the valve stem 19 and operatively connected with an operating lever 25, as shown. By this arrangement, it will be noted that the valve 18 will seal the inner end of the trunnion lining and thus prevent access of the material in the filter chamber 3 to the nipple 11 and thus preventing the deleterious action of corrosive material in said chamber on said nipple.

When it is desired to supply material to the filter chamber, the valve 18 may be readily opened by manipulating the lever 25. The spring 22 will serve to reseat the valve and with internal pressure in the filter chamber, will serve to hold the valve seated.

An air supply pipe or tube 26 is extended into the tubular valve stem 19 through a suitable stuffing box or gland 27, whereby compressed air may be readily supplied to the interior of the filter chamber when desired and without opening the valve 18. The air supply pipe 26 is supported in a bracket 28, as indicated.

While the preferred form of construction for carrying the invention into effect has been illustrated and described, this is capable of variation and modification without departing from the spirit of the invention. It is, therefore, not desired to limit the patent to the precise details disclosed but to include therein also such variations and modifications as fall within the scope of the appended claims.

I claim:

1. A filter comprising a revolving chamber having a hollow axial trunnion at one end; a supply nipple extending into said trunnion; connections for introducing material through said nipple; a valve seating against the inner end of said trunnion; a tubular valve stem for said valve passing outwardly through said nipple; an air supply nipple projecting into said valve stem; a spring on said valve stem holding said valve to its seat; and means outside of said nipple for manipulating said valve stem.

2. A filter comprising a revolving chamber having a hollow axial trunnion at one end; a lining for said trunnion provided at its inner end with a valve seat; a stationary supply nipple extending into said trunnion; connections for introducing material through said nipple; a valve seating against the inner end of said trunnion lining; a tubular valve stem for said valve passing outwardly through said nipple; an air supply nipple projecting into said valve stem; and means outside of said nipple for manipulating said valve stem.

3. A filter comprising a revolving chamber having a hollow axial trunnion at one end; a lining for said trunnion provided at its inner end with a valve seat; a stationary supply nipple extending into said trunnion; connections for introducing material through said nipple; a valve seating against the inner end of said trunnion lining; a tubular valve stem for said valve passing outwardly through said nipple; an air supply nipple projecting into said valve stem; a spring on said valve stem outside of said nipple and serving to hold said valve to its seat; and an operating lever operatively connected with the outer end of said valve stem.

4. A filter for ore slimes and the like containing gritty pulp, which comprises a shell to which rotation is imparted in operation, a hollow trunnion for rotatably mounting said shell at one end comprising a renewable lining sleeve and provided with an inwardly facing valve seat, a stationary supply nipple which extends into said trunnion but terminates short of the valve seat thereon, the bore of said renewable lining sleeve being fitted to said stationary supply nipple so as to turn freely thereon, a valve seating on the valve seat on the trunnion and means for manipulating said valve comprising a valve stem which projects outside of said nipple.

In witness that I claim the foregoing as my invention, I affix my signature this 30 day of November, 1928.

EDWIN BURT.